United States Patent [19]

Busch

[11] Patent Number: 4,729,865

[45] Date of Patent: Mar. 8, 1988

[54] NUCLEAR FUSION REACTOR

[76] Inventor: Merrill P. Busch, 5541 NE. 72nd, #6, Portland, Oreg. 97218

[21] Appl. No.: 926,326

[22] Filed: Nov. 3, 1986

Related U.S. Application Data

[63] Continuation of Ser. No. 810,577, Dec. 19, 1985, abandoned.

[51] Int. Cl.$^4$ .............................................. G21B 1/00
[52] U.S. Cl. .................................... 376/107; 376/123; 376/126; 376/127; 376/133; 376/142; 376/150
[58] Field of Search ...................... 376/142, , 107, 123, 376/124, 126, 132, 133, 120, 150, 138, 127; 335/216; 336/229, 234, 233

[56] References Cited

U.S. PATENT DOCUMENTS

| | | | |
|---|---|---|---|
| 4,263,096 | 4/1981 | Ohkawa et al. | 376/142 |
| 4,295,113 | 10/1981 | Bjorklund et al. | 336/234 |
| 4,330,864 | 5/1982 | Ohyabu | 376/133 |
| 4,349,506 | 9/1982 | Rawls et al. | 376/142 |
| 4,560,528 | 12/1985 | Ohkawa | 376/142 |
| 4,584,159 | 4/1986 | Salisbury | 376/107 |

OTHER PUBLICATIONS

Scientific American, Oct. 1983, The Engineering of Magnetic Fusion Reactors—pp. 60-71.

Primary Examiner—Deborah L. Kyle
Assistant Examiner—Daniel Wasil
Attorney, Agent, or Firm—Eugene M. Eckelman

[57] ABSTRACT

The present invention is a nuclear fusion reactor serving to contain a totally organized tritium-deuterium plasma by guiding the self-bombarding particles in a resonating path of a particular wavelength and frequency, similar to a radio wave. Under these conditions the electrons tend to remain cooler, which reduces plasma radiation energy losses. Energy may be added to the plasma by axially distributed oscillators of the proper frequency, raising the plasma to ignition temperature and densities. Finally the ignited plasma directs its high energy neutrons into strategically located lithium blankets and the ionic energy levels are controlled by causing the plasma to generate an alternating electric current. Various types of alternate fusion reactions are briefly considered.

4 Claims, 3 Drawing Figures

NUCLEAR FUSION REACTOR

REFERENCE TO PRIOR APPLICATIONS

This is a continuation in part of application Ser. No. 810,577, filed Dec. 19, 1985, now abandoned.

BACKGROUND OF THE INVENTION

This invention relates to improvements in nuclear power generation.

The oil embargo of 1973 illustrated the vulnerability of the industrialized world to the interruption of its energy supply, and since that time considerable work and research have been done on alternate types of energy, particularly energies having an endless source of supply. One such source of energy is nuclear fission, which clearly has inherent disadvantages, such as long term radioactivity and the resulting negative public opinion. Design projects are now under way to test the practicality of generating power from the thermonuclear fusion of ions trapped by magnetic fields. Torus-shaped reactors have been built which seek to burn deuteruim-tritium mixtures. An alternative research project, a structure identified as a tandem mirror, comprises a device in which a plasma is confined by magnetic and electrostatic barriers at each end of a linear sequence of magnets. To date no device has demonstrated a particle containment adequate to provide a practical fusion reactor. Other disadvantages associated with the existing machines are extensive lithium blanket requirements and the problem of random, uncontrollable 14 MeV neutron emission.

SUMMARY OF THE INVENTION

According to the present invention and forming a primary objective thereof, a nuclear fusion reactor is provided that has a low contruction cost, that provides a unique plasma self-containment with relatively modest magnetic fields, that has a high output of energy, and that directs its high energy neutrons into lithium blankets of limited size while largely confining neutron damage to specific, easily replaceable structures.

In carrying out these objectives, a metallic wave guide of rectangular cross section is positioned between super-conducting upper and lower extended electromagnets of horseshoe-type cross section, producing oppositely-directed vertical magnetic fields in close proximity through the continuous wave guide along its entire perimeter. Vertical particle containment is achieved through the use of very narrow and closely spaced ferromagnetic by-pass vanes, which produce a type of composite magnetic field composed of narrow, curving segments spaced between wider, weaker layers of vertical magnetic field across all four corners of the wave guide cross section along its entire perimeter, rather like double-edged razor blades embedded in a pound of cheese. These narrow, curving magnetic fields reverse the vertical components of horizontally oscillating plasma ions, and in conjunction with a horizontally resonating ionic wave actively damp the vertical components of the ionic oscillations, which together produce a highly effective type of plasma self-containment.

High energy deuterons are injected into the wave guide from an accelerator, and being tangentially introduced, are caused to oscillate across the oppositely-directed magnetic field boundary in circular arc lengths with some specific intersection angle and at some specific frequency in accordance with the strength of the vertical magnetic fields. The injected deuterons spontaneously arrange themselves into two narrow, oppositely-phased groups, constituting a horizontally pulsating, self-bombarding wave, resonating along the continuous wave guide which has an effective perimeter equal to an odd number of half-wavelengths of the ionic oscillation frequency.

Electrons from an incandescent wire are distributed through the plasma along the boundary between the vertical magnetic fields and move horizontally inward and outward within the resonating groups of ions under the influence of microwave frequency electric fields, and axially in the same manner because of the inductance of the rapidly converging and diverging ionic wave. The magnetic viscosity of the powerful magnetic fields forces the electrons to arrange themselves into systems of pulsating, parallel charges, producing highly organized microwave patterns which propagate within the narrow ionic wave and permit the electrons to ratchet their way rapidly across the magnetic field lines. The plasma ions absorb energy from the powerful microwave component of the resonating plasma pulsations, creating a circulating energy flow which lowers the electron temperature and reduces plasma radiation energy losses. The electrons also produce a transformer effect upon the plasma ions due to their inductance which selectively reduces each of the oscillating ions to the vicinity of the mean amplitude and energy level of that type of ion. More importantly, the powerfully organized plasma pulsations reincorporate each type of oscillating ions to beta-1 densities counter to the effects of coulomb scattering; largely because the resonating ionic wave develops a pulsating self-field which increases outwardly within each narrow group of ions and which continuously maintains its stability. A type of ionic bellows-action is developed in the plasma due to the extremely high density at its inner pulsation node which further reduces the electron temperature. The resonating plasma pulsations automatically adjust the various intersection angles between the oscillating ions and the oppositely-directed magnetic field boundary to maintain the resonant frequency in the existence of changing magnetic field strengths and ionic energy levels, which serves to automatically adjust the resonating ionic wave to the length of the wave guide.

Deuterium and tritium neutral particle beams are injected tangentially along the magnetic field boundary, become ionized, and the particles arrange themselves at the proper amplitudes and intersection angles to allow them to become incorporated into the plasma pulsations. Energy is added to the plasma from external oscillators of the proper frequency through a system of equally spaced probes extending to the wave guide surface. The powerfully resonating plasma pulsations may be compared to a giant, nuclear-driven oscillator which produces a reverse-voltage counter to the external oscillator impulses and which increases with ionic density and energy levels. During an initial start-up procedure the external oscillator voltage is maintained above that of the pulsating plasma, energy flows into the wave guide, and the particle energy levels are maintained until an ignition density can be obtained. After ignition has been achieved the situation is reversed and energy is removed from the plasma through the external oscillators to maintain an optimal collision energy level for the narrow, beta-1 groups of head-on colliding tritons and deuterons at the plasma inner pulsation node.

Replacement deuterium and tritium ions are introduced into the wave guide and are rapidly raised to their mean energy levels by the electron transformer effect and by the circulating microwave and ionic bellowsaction energies, while suprathermal alpha particles produced by fusion events are reduced to the mean energy level of the helium ash by the same process.

Various types of alternate fusion reactions are briefly considered.

The invention will be better understood and additional advantages will become apparent from the following description taken in connection with the accompanying drawings.

DETAILED DESCRIPTION OF A PREFERRED EMBODIMENT

In connection with the detailed description of the structure and operation of the present invention, it is to be understood that dimensions and values set forth are illustrative only and may be greater or lesser depending upon the size of reactor and the output desired.

Figure 1:
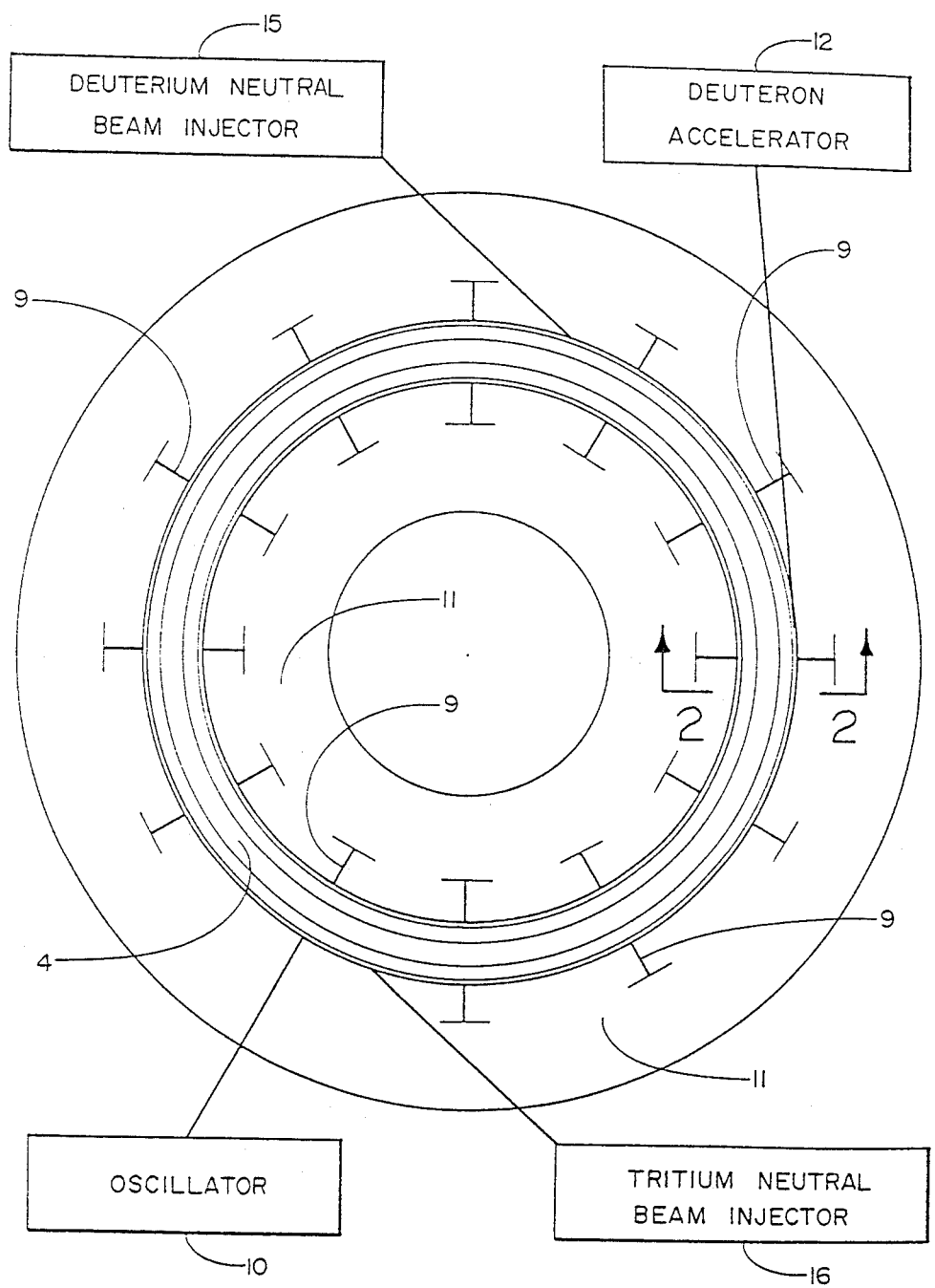
FIG. 1 is a diagrammatic plan view of the nuclear reactor embodying features of the invention.
Figure 2:
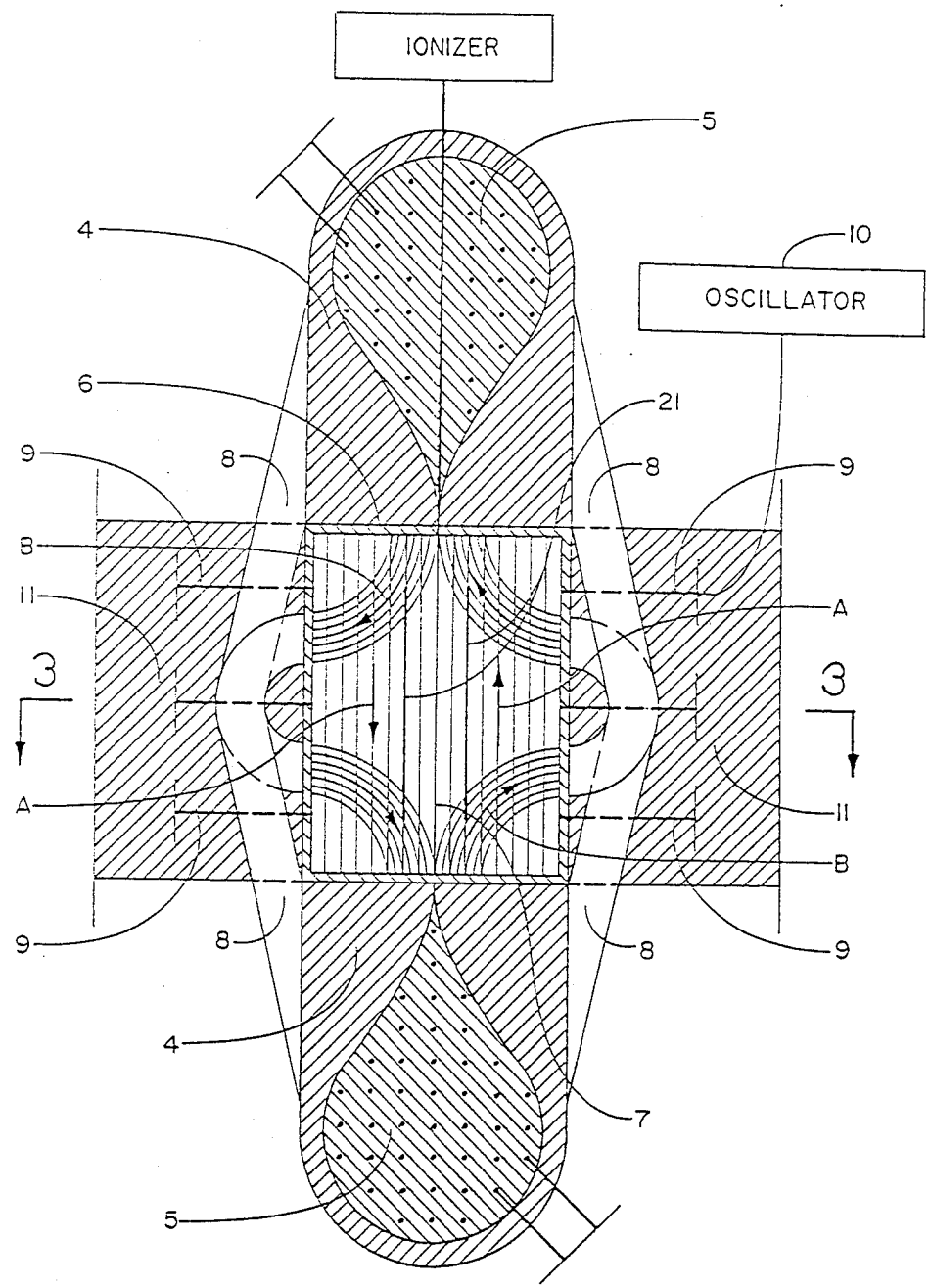
FIG. 2 is an enlarged cross sectional view of the nuclear reactor of FIG. 1, this view being taken on the line 2—2 of FIG. 1 and also being diagrammatic.

Referring in particular to the drawings and first to FIGS. 1 and 2, two large toroidal electromagnets 4 are provided which are opposite hand to each other and both of which possess horseshoe-type cross sections with the openings containing longitudinal superconducting winding means 5. The large electromagnets are vertically positioned one below the other as shown in FIG. 2 such that a continuous flow of magnetic flux will pass through a toroidal metallic wave guide 6 of rectangular cross section which is positioned between them, this occurring all along the entire circumference of all three structures. This continuous flow of magnetic flux, as indicated by the straight arrows A in FIG. 2, passes downward through half of the wave guide 6 cross section and upward through the opposite half, forming the boundary 7 between the two parts of the magnetic field. When the wave guide 6 is curving as in the present case the inner magnetic poles must extend wider inwardly to cause the inner magnetic field A to be slightly weaker than the outer magnetic field.

Figure 3:
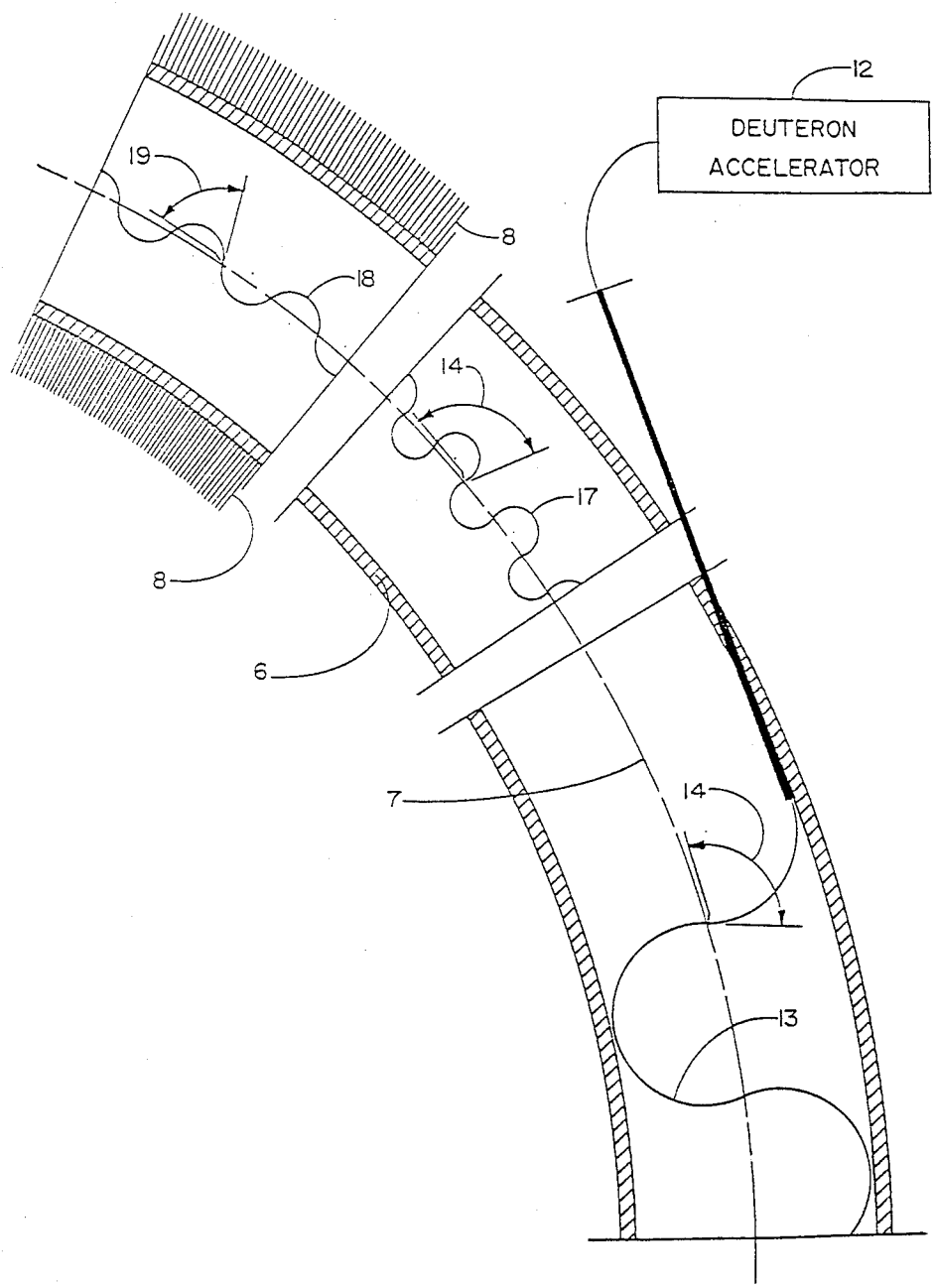
FIG. 3 is an enlarged, cross sectional plan view of the nuclear reactor of FIGS. 1 and 2, this view being taken on the line 3—3 of FIG. 2 and also being diagrammatic.

Very narrow but closely spaced ferromagnetic bypass vanes 8 extend downward and outward from the lower ends of both vertical surfaces of the upper electromagnet 4, and upward and outward from the vertical surfaces of the lower electromagnet, with the vanes spaced equidistantly to pass between each other. Only a representative number of these vanes 8 are shown in FIG. 3 but it is to be understood that they are equally spaced around the entire wave guide. The ends of the ferromagnetic by-pass vanes 8 are curved in toward the wall guide 6, terminating with their end surfaces positioned against the wave guide and well beyond the midpoint of its vertical surfaces, as shown in FIG. 2. Spaces between the vanes contain a lattice of support material, and should magnetic flux leakage between parallel, opposite-hand components prove to be extreme the vanes might appear as fanlike structures at the ends of solid ferromagnetic bars such that opposite-hand components are well separated. The by-pass vanes 8 present a considerably shorter magnetic flux path and produce a type of composite magnetic field across all four corners of the toroidal wave guide cross section, consisting of very narrow, concentrated, curving segments of magnetic field as indicated by the curved arrows B in FIG. 2, spaced between much wider, weaker layers of vertical containment field as indicated by the straight arrows A, with opposite-hand components being equidistantly staggered.

A plurality of equally spaced oscillator probes 9 from oscillators 10 are positioned about the entire circumference of the toroidal wave guide 6, extending to its entire surface. The probes 9 provide a type of transverse electromagnetic coupling between a pulsating plasma within the wave guide and the oscillators 10 with the plasma assuming the function of an internal coaxial cable. The volume enclosed by the wave guide 6 is a vacuum, produced by conventional vacuum pumps. Ringlike lithium blankets 11 extend horizontally inward and outward from the toroidal wave guide 6 with a vertical thickness equal to the height of the waver guide, as shown schematically in FIG. 1.

A representative size for the toroidal wave guide 6 is 26 cm wide by 34 cm high internally with a mean circumference of 7.5 meters. A representative outer magnetic field A is 33.2 kG with a 29.8 kG inner magnetic field serving to balance the plasma pulsations. A representative spacing for the ferromagnetic by-pass vanes 8 is 1 cm with a vane thickness narrowing to 1 mm at their end surfaces. A representative reactor shape is a toroid with a mean circumference equal to an odd number of wavelengths of the plasma pulsation frequency.

In initiating operation of the system, 2.25 MeV deuterons are injected tangentially into the wave guide 6 by the deuteron accelerator 12, at the midpoint of its vertical surfaces. Some of the vanes 8 will be outwardly distorted somewhat to allow the ions to be injected. The deuterons, designated by the numeral 13 in FIG. 3, intersect the magnetic field boundary 7 at the center of the wave guide 6 with 108° intersection angles 14, and are caused to oscillate in circular arc lengths along the wave guide 6 with amplitudes of 12 cm and with frequencies of 20 MHz. If the mean circumference of the wave guide 6 is selected to be 7.5 meters the ions will spontaneously arrange themselves into two narrow, oppositely-phased groups, constituting a horizontally pulsating, self-bombarding wave, resonating around the toroidal wave guide 6 with a frequency of 40 MHz and with a free-space phase velocity. These groups of oscillating ions, shown as they would appear at the plasma outer pulsation node reduced to 100 keV energy levels and with ignition widths, are indicated by the numeral 21 in FIG. 2. the resonating ionic wave perpetuates itself by continuously reincorporating the oscillating ions to beta-1 densities counter to their own coulomb scattering, largely because the oscillating ions maintain similar amplitudes and develop a pulsating self-field which increases outwardly within each narrow group of ions 21 and which continuously maintains its stability.

Electrons from an incandescent wire are distributed through the plasma along the boundary 7 between the oppositely-directed magnetic fields A and move horizontally inward and outward within the narrow, resonating groups of ions 21 under the influence of microwave frequency electric fields, and axially in the same manner because of the inductance of the rapidly converging and diverging ionic wave. The magnetic viscosity of the oppositely-directed magnetic fields A forces the electrons to arrange themselves into systems of parallel charges pulsating at cyclatron frequencies parallel to the wave guide 6, producing highly organized microwave patterns which propagate within the beta-1 ionic wave as multiple harmonics of the plasma pulsation frequency, and which enable the electrons to ratchet their way rapidly across the magnetic field lines.

Why should this scenario evolve and not any one of a million others? Because it becomes established at optical plasma densities and because it is the only system other than purely random which can achieve a stabilized continuation within the given parameters. Plasmas are not observed to spontaneously revert to random conditions and an exact adherence during early stages is not required.

The electrons most likely move in the required precise numerical flow only when the microwave electric fields locally exceed the oppositely-directed magnetic fields A, and when their accompanying J×B behavior locally nullifies and doubles the magnetic fields A, and the microwave component of the resonating plasma pulsations causes the vertical magnetic field lines to vibrate like violin strings at GHz frequencies. The slightest departure from a precise numerical electron flow results in powerful electric fields which then propagate within the plasma with phase velocities appropriate to the resonating plasma pulsations, reinforcing and canceling each other until the proper microwave patterns are obtained to produce the required electron flow. The individually oscillating electrons must execute collectively coordinated, drifting-elliptical mode shapes in the process of ratcheting across the 33.2 KG magnetic fields A at the 40 MHz plasma pulsation frequency, which tends to reduce them all to the same temperature and which largely reduces their motions to horizontal planes. The unimpeded resonance establishes a situation in which every particle, including instantaneous scattering distributions, is arranged into some type of coordinated pattern, leaving nothing to be unstable. The microwave patterns actually constitute a type of powerful plasma self-field which eliminates rather than overcomes portions of the internal plasma pressure. Microwaves escaping from the plasma propagate within the metallic wave guide as powerful ionizing agents which prevent the backstreaming of thermal velocity neutral particles into the plasma, except in shielded collection channels leading to the vacuum pumps.

The theory is that electrons correlated into extremely powerful microwave-sustaining patterns in maintaining normal charge and induction equilibriums can only produce a greatly reduced plasma pressure and syncrotron radiation of a corresponding lower power density. The microwaves are contained within the pulsating plasma and within the metallic wave guide 6, and locally concentrate and disperse the vertical magnetic fields A, causing the oscillating plasma ions to jiggle, and transferring large amounts of energy from the pulsating electrons to the oscillating plasma ions. In an electromagnetically resonating plasma equilibriums tend to be established by charge velocities in addition to particle energy levels. The energy is returned to the electrons through ionic collisions but the resulting massive circulating energy flow results in a uniform, greatly reduced electron temperature and a further reduction of all types of plasma radiation energy losses, with the possibility of using advanced fusion fuels. A large portion of the plasma radiation energy losses might be reabsorbed in passing outwardly through the concentrated microwave beams produced by the coordinated electron charges pulsating parallel to the wave guide 6.

Suppose, as an example, that the oppositely-directed magnetic fields A were increased from 33.2 kG to 40 kG. What happens to the plasma pulsations? The intersection angle 14 of the oscillating deuterons at the center of the wave guide 6 simply increases to 130°, their amplitudes increase slightly when the intersection angle remains less than 135°, and the particles continue to resonate at about 20MHz. If the magnetic fields A are reduced to 26.4 kG the intersection angle 14 decreases to 86°, their amplitudes decrease slightly in retaining the proper periods, and the particles continue to resonate at about 20 MHz. Increasing or decreasing the energy levels of the particles increases or decreases their amplitudes without greatly affecting their intersection angles, as in a cyclotron.

Consider an ion oscillating horizontally in phase with the plasma pulsations, possessing a modest vertical velocity, and entering a pair of composite magnetic fields at the top or bottom of the wave guide 6. The horizontal components of the narrow, curving magnetic fields B convert the vertical velocity of the ion into horizontal velocity and the amplitude of the ion tends to increase while it remains in phase with the horizontal plasma pulsations. But the vertical components of the curving magnetic fields B decrease the horizontal amplitude of the ion, and its intersection angle 14 increases and then decreases as the ion moves into and exits from the composite magnetic fields. The vertically oscillating ion generally exits from the composite fields leading the plasma pulsations but moves back into phase at the vertical midpoint of the wave guide 6 because of a generally increased intersection angle 14. The ion enters the alternate composite fields trailing the plasma pulsations, moves back into phase at its point of maximum penetration, exits from the composite fields leading the plasma pulsations, and moves back into phase at the vertical midpoint of the wave guide 6. A vertically oscillating ion will thus develop a slightly larger average intersection angle 14 and will continuously teeter slightly out of phase in both directions with the resonating plasma pulsations. But the resonating plasma pulsations continuously manipulate the vertically oscillating ions in both directions, particularly while their intersection angles are changing, in an attempt to reincorporate them back into phase, resulting in an immediate and powerful damping of the vertical components of the ionic oscillations, and the ions contain themselves within the modest magnetic fields A and B. This is actually a controlled application of the type of behavior which occurs randomly in unstable plasmas - energy flows into structured configurations. A powerful, horizontally resonating composite wave of enormous power density must be visualized as drawing energy out of the vertical components of its particle oscillations, particularly where pulsating, outwardly-increasing self-fields exist within the plasma.

This damping phenomenon must not be confused with the typical reflection of particle velocities that occurs in a standard mirror machine. A designer of choke-field magnets would note that the composite fields will not contain a particle of determined vertical velocity. Such velocities are not obtainable through the statistical accretion of a large number of small-angle coulomb collisions. Large-angle collisions between reactive particles such as two tritons tend to result in fusion events, particularly in this structured environment. Collisions with helium ash tend to scavenge an alpha particle in one direction with the loss of a deuteron or a triton in the other. The elliptical, constantly changing mode shapes assumed by the pulsating electrons in their horizontal microwave orientation actively damp vertical electron oscillations and allow the electrons to be contained within their own modest electrostatic field in a manner similar to the vertical ionic containment. The higher propensity of the electrons to scatter is compensated by the higher frequency of the damping mechanism, and by the uniform, greatly reduced electron temperature.

It is possible to consider the arc lengths of all the various ions oscillating in phase to be partial individual turns in a sinusoidal transformer operating at 40 MHz, similar to what occurs between the electrons and the patterned microwaves. Each of the ionized particles contributes to an induced electron flow at the plasma outer pulsation node as a function of its charge, velocity, and intersection angle, and receives slightly-more-average electron inductances as the plasma proceeds to its inner pulsation node. Each particle is rapidly reduced to the vicinity of the mean amplitude and energy level of that type of particle including replacement electrons, newly introduced deuterons and tritons, and suprathermal alpha particles as they are reduced to the mean energy level of the oscillating helium ash. In theory this transformer effect would rapidly reduce both the amplitudes and the energy levels of the narrow groups of doubly-charged, oscillating helium ash to half that of the oscillating deuterons while the groups of tritons would become several times more energetic because of their smaller velocities and intersection angles. The helium ash might be readily scavenged at low temperatures out the ends of the composite fields. It will be later shown that half of the collisions between deuterons and tritons occur from a head-on direction while the other half are from the rear, offset 36° to the side - advantage deuterons. Half of the collisions between deuterons and alpha particles occur from a head-on direction, offset 36° to the side, while the other half are from the rear - advantage alpha particles. Half of the collisions between tritons and alpha particles occure from a head-on direction, while the other half are from the rear, offset 36° to the side-advantage tritons. The summation of all of this appears to indicate the scavengement of the helium ash by the energetic tritons, and an excellent plasma containment.

The plasma pulsations also induce an alternating voltage in the wave guide 6, which sees the plasma as an internal coaxial cable, with its charge separations and pulsating self-field constituting a type of transverse electromagnetic wave. This alternating voltage constitutes the input impulses in the axially distributed oscillators 10, which also produce a type of powerful, unidirectional, 40 MHz transverse electromagnetic wave in the wave guide 6, with the plasma radiation energy losses producing the equivalent of powerful Q losses in the wave guide 6. The powerfully resonating plasma pulsations may be compared to a giant, nuclear-driven oscillator which produces a reverse-voltage counter to the oscillator impulses and which increases with ionic density and energy levels. This voltage is due to ohmic impedance reducing the induced electron flow, which produces a pulsating self-field and an alternating electric field in the plasma. During an initial start-up procedure the oscillator voltage is maintained above that of the pulsating plasma, energy flows into the wave guide 6, and the particle energy levels are maintained until an ignition density is obtained. After ignition has been achieved the situation is reversed and energy is continuously removed from the pulsating alpha particle halo through the oscillators 10 to maintain an optimal collision energy level for the narrow, beta-1 groups of head-on colliding tritons and deuterons which widen out with increasing plasma density.

Returning again to the start-up procedure, the developing ionic wave assumes similar particle velocities and amplitudes about some rapidly decreasing energy level, which then becomes stabilized at between 100 and 200 keV by the introduction of a relatively small amount of energy from the oscillators 10. The primary purpose of the 2.25 MeV deutron accelerator 12 is to produce a powerfully resonating, beta-1 composite wave and to develop its microwave component into an effective ionizing medium. 100 keV neutral deuterium and tritium beams are tangentially injected slightly inward from the centerline of the wave guide 6 by the injectors 15 and 16, the beam particles become ionized within about 4 cm of the magnetic field boundary 7, and the ions arrange themselves at the proper intersection angles to allow them to become incorporated into the resonating plasma pulsations.

The injected 100 keV deuterons, designated by the numeral 17 in FIG. 3, arrange themselves at about the same 108° intersection angle 14 as the 2.25 MeV deuterons 13, but the injected 100 keV tritons, designated by the numeral 18 in FIG. 3, arrange themselves at a 72° intersection angle 19. This demonstrates how disparate particles can contribute to the same resonating fusioning wave while meeting in periodic head-on collisions at the center of the wave guide 6. The ionic oscillation frequencies actually decrease slightly with increasing particle energy levels and increase slightly with increasing intersection angles, causing 10 keV deuterons, for example, to resonate at higher frequencies than 100 keV tritons with their high axial velocities, and with most of the ions ending up with slightly different intersection angles 14 at the center of the wave guide 6.

The composite magnetic fields contain the particles, the oscillators 10 provide a massive infusion of energy, and the neutral particle beam injectors increase the plasma density to achieve ignition, after which the magnetic fields A must be readjusted to achieve the maximum energy production in the existence of the various plasma self-fields. The neutral particle beam injectors can be used to maintain the plasma density through a smaller number of particles at a reduced energy level, but low energy replacement ions might be more efficiently drifted vertically into the resonating ionic wave from the ionizer 20 along the boundary 7 between the oppositely-directed magnetic fields A. The neutral particle beam injectors might be eliminated, with the plasma being raised to ignition energy levels solely by the oscillators 10.

The density of the ionic wave at its inner pulsation node is not limited to a theoretical beta-1 value as determined by the reduced electron temperature and the microwave self-field. The oscillating deuterons, tritons, and alpha particles have different mean amplitudes and the beta-1 density of each doubles as opposite sides pass through each other. It might be possible to employ some type of catalyzed, slower reacting deuterium fuel.

The narrow groups of ions 21 widen rapidly in the vicinity of the inner pulsation node due to plasma pressure and reconverge more slowly everywhere else due to their outwardly-increasing self-fields. The resulting ionic bellows-action literally pumps energy out of the electrons and would be very important in the burning of advanced fusion fuels. The resonating ions implode, pass through, and explode back to beta-1 vicinities while simultaneously producing lateral electron explosions, and each of the ions is periodically accelerated laterally across the resulting electric potentials which move with free-space phase velocities. The 72° intersection angle 19 of the oscillating tritons increases their outwardly-increasing self-fields, which serves to increase their intersection angle 19, which then permits a smaller, more stable deuteron intersection angle 14.

If the fusion fuel is properly polarized the 3.5 MeV alpha particles will be emitted at the plasma inner pulsation node in phase with the resonating plasma pulsations with the same intersection angle 14 as the oscillating deuterons and with 71% of the amplitude of a deuteron of an equal energy level. If the planes-of-action of the fusion events are assumed to be roughly horizontal the 3.5 MeV alpha particles will oscillate within the wave guide 6 with amplitudes of 11 cm and the 14 MeV neutrons will penetrate the vertical side walls of the wave guide and enter the inward and outward located lithium blankets 11 at angles corresponding to the intersection angle 19 of the oscillating tritons. Neutron damage is largely limited to the sides of the wave guide 6, the ferromagnetic by-pass vanes and supports 8, and the oscillator probes and cables 9. The various beta-1 groups of resonating ions 21 are supplemented by an internally pulsating halo of accelerating tritons and deuterons and by an externally pulsating halo of decelerating suprathermal alpha particles.

The fusion reactor is capable of being converted to a catalyzed deuterium reaction at higher particle energy levels. The 33.2 kG magnetic field A is reduced to 24.6 kG to bring the resonating deuterons together with 80° intersection angles 14, which then increase to perhaps 85° due to the outwardly-increasing self-fields. Synthesized tritium ions would then oscillate with 53.3° intersection angles, and sythesized helium-3 ions would oscillate with 106.6° intersection angles. Alpha particles would oscillate with 80° intersection angles, as would synthesized 3 MeV protons with twice the deuteron oscillation frequency. 14.6 MeV protons would be containable only if the oscillation frequencies and the 24.6 kG magnetic field A were doubled. Each type of ion would resonate in two beta-1 groups 21 with an energy level determined by a combination of the transformer effect, coulomb collisions, and the circulating microwave and ionic bellows-action energies.

Interesting reactions can be made to occur when 13.5 MeV protons are injected into a 37 kG magnetic field A to produce a 120 MHz, 80°-85° resonating proton wave, maintained at 1 MeV by the oscillators 10. Ions of lithium, beryllium or boron could be drifted into such a plasma, but these reactions would not generally be self-supporting or even containable in this machine, except in the case of lithium-7 if the ionic bellows-action could keep the electrons cool. The massive, low velocity lithium ions would resonate in two beta-1 groups 21 with beginning intersection angles of 34.3°, which would then increase somewhat due to the powerful, outwardly-increasing self-fields. The density and reaction rate of the resonating lithium fuel would be determined by the final electron temperature.

The 85° intersection angle of the bombarding protons would produce pairs of 8.5 MeV alpha particles which would resonate in four distinct groups with 80° intersection angles and with half the proton oscillation frequency. Half of the collisions between resonating plasma protons and alpha particles would occur at the plasma inner pulsation node, with half of these being from behind and half occurring from a forward direction. All of the collisions between protons and alpha particles occurring at distances from the plasma inner pulsation node would possess distinct forward-direction collision components, and the lithium fuel might also resonate in four distinct groups at half the proton oscillation frequency with beginning intersection angles of 68.6°. In theory the alpha particle ash would consistently lose energy to both the plasma protons and the lithium ions until it would be scavenged at low temperatures out the ends of the composite fields. This would be very important from the standpoint of first wall loading and impurity suppression, and also in retaining an additional 2 MeV of energy within the plasma for each fusion event, which is applicable in principle for any fusion fuel.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A magnetic fusion reactor comprising,
    a hollow metallic wave guide, closed upon itself, having a rectangular cross section and containing an electromagnetically resonating, pulsating, self-bombarding plasma in a vacuum,
    a plurality of equally spaced probes extending to the inner surface of said wave guide and producing a type of transverse electromagnetic coupling with said resonating plasma, with said plasma acting as an internal coaxial cable,
    said wave guide being vertically positioned between two extended opposite-hand electromagnets which are closed upon themselves and having horseshoe-type cross sections with horizontally oriented bases, and with their internal openings having tear-shaped cross sections containing longitudinal superconducting winding means and coming to a central point such that oppositely-directed magnetic fields are produced vertically in close proximity throughout the entire extent of said wave guide, upwardly directed through one side of said wave guide and downwardly directed through the opposite side,
    a plurality of equally spaced, ferromagnetic by-pass vanes extending from the vertically oriented surfaces on each side of said opposite-hand electromagnetics, said vanes sloping outward and upward or downward respectively and being spaced to pass equidistantly between opposite-hand components, said vanes curving inward past the vertical midpoint of said wave guide and terminating with their end surfaces parallel to the vertical surfaces of said wave guide, and thus producing narrow, concentrated, curving magnetic fields interspaced with much wider, weaker thicknesses of said oppositely-directed vertical magnetic fields across each corner of the cross section of said rectangular wave guide throughout its entire extent.

2. The magnetic fusion reactor of claim 1 including means for tangentially injecting ions of a specific energy level in an initial start-up procedure, to oscillate in circular arc lengths at a specific resonance frequency when the injected ions are caused by said oppositely-directed magnetic fields of a specific strength to intersect the boundary between said magnetic fields at some specific intersection angle, with the effective length of said wave guide being equal to an odd number of half-wavelengths of said resonance frequency, wherein said injected ions are caused to spontaneously arrange themselves into two narrow, oppositely-phased groups, constituting a horizontally pulsating, resonating, self-bombarding wave, producing pulsating, outwardly-increasing self-fields and propagating along said wave guide with a free space phase velocity, said pulsating ionic wave continuously incorporating oscillating ions of various types while causing said ions to develop commensurate intersection angles with the boundary between said oppositely-directed magnetic fields, said ions being introduced by any and all means, while also continuously reincorporating each type of said oscillating ions into two oppositely phased, resonating, beta-1 density groups counter to the effects of coulomb scattering, said pulsating ionic wave continuously adjusting the intersection angles of said oscillating ions with the boundary between said oppositely-directed magnetic fields, thereby automatically adjusting itself to the length of said wave guide, said pulsating ionic wave incorporating oscillating ions having intersection angles with the boundary between said oppositely-directed magnetic fields of less than 90°, thereby increasing the pulsating plasma self-field, thus increasing the stability of said pulsating ionic wave and improving the plasma containment, said pulsating ionic wave causing said oscillating ions to enter said narrow, curving magnetic fields in such a manner that the horizontal components of said curving magnetic fields convert the vertical velocities of said ions into horizontal velocities and back again, but with the vertical components of said curving magnetic fields causing said oscillating ions to continuously teeter slightly out of phase in both directions with said horizontally pulsating ionic wave, thereby creating a continuous damping of the vertical velocities of said ions as said pulsating ionic wave attempts to reincorporate them back into phase, said pulsating ionic wave creating large numbers of head-on, fusion-producing collisions between said oscillating ions at the plasma inner pulsation node with the planes-of-action of the fusion events being roughly horizontal, thus causing positive charged suprathermal particles to be contained within said wave guide and directing high energy neutrons into appropriately positioned lithium blankets with limited neutron damage.

3. The magnetic fusion reactor of claim 2 including means for introducing electrons along the boundary between said oppositely-directed magnetic fields, wherein pulsating changes in background charge density and massive inductances produced by said pulsating, resonating ionic wave created by tangentially injected ions cause said electrons to arrange themselves into systems of parallel charges pulsating at electron cyclotron frequencies, producing extremely powerful microwave patterns which propagate within said pulsating ionic wave and within said metallic wave guide as high frequency harmonics of the plasma pulsation frequency, thereby causing said electrons to ratchet their way rapidly across the magnetic field lines, said electrons being correlated into powerful, constantly changing, horizontally oriented, microwave-sustaining patterns and thereby serving to damp their own vertical oscillations, and to contain themselves within their own electrostatic field, while also producing a reduced plasma pressure and syncrotron radiation of a corresponding lower power density, said electrons being correlated into powerful microwave-sustaining patterns and locally concentrating and dispersing said oppositely-directed magnetic fields, causing said oscillating ions to jiggle at high frequencies and creating a circulating flow of energy from said electrons to said oscillating ions and back again due to ionic collisions, thereby producing a reduced electron temperature with lowered radiation energy losses and higher article densities, said electrons producing a transformer effect whereby said oscillating ions are caused to contribute to an induced flow of said electrons at the plasma outer pulsation node as functions of their individual charges, velocities, and intersection angles with the boundary between said oppositely-directed magnetic fields, and to receive slightly-more-average electron inductances as the plasma proceeds to its inner pulsation node, thereby rapidly reducing each of the said oscillating ions to the vicinity of the mean energy level of that type of ion, including newly introduced replacement ions and positive charged suprathermal particles as they become incorporated into the plasma pulsations, said electrons producing lateral electric potentials at the plasma inner pulsation node, causing said narrow, beta-1 groups of resonating plasma ions to periodically widen rapidly and then to reconverge more slowly due to their outwardly-increasing self-fields in a type of bellows action which produces a further reduction in the plasma electron temperature.

4. The magnetic fusion reactor of claim 2 including oscillating means connected to said equally spaced probes, wherein said pulsating, resonating ionic wave created by tangentially injected ions is caused to produce an alternating voltage in said oscillating means, causing said oscillating means to respond with a powerful, more conventional type of resonating, unidirectional, transverse electromagnetic wave within said wave guide, thereby causing said plasma to obtain such particle energy levels and densities as are required to cause said ions to undergo nuclear fusion reactions, said transverse electromagnetic wave produced by said oscillating means removing energy from said pulsating plasma after such nuclear fusion reactions have been obtained, thereby causing said plasma to operate with optimal particle energy levels in obtaining the highest possible power density for any desired type of fusion reaction.

* * * * *